United States Patent [19]

Vo

[11] Patent Number: 4,715,867
[45] Date of Patent: Dec. 29, 1987

[54] AUXILIARY BED PRESSURE SWING ADSORPTION MOLECULAR SIEVE

[75] Inventor: Toan P. Vo, Pittsburgh, Pa.

[73] Assignee: Calgon Carbon Corporation, Pittsburgh, Pa.

[21] Appl. No.: 848,309

[22] Filed: Apr. 4, 1986

[51] Int. Cl.⁴ .............................................. B01D 53/04
[52] U.S. Cl. ...................................... 55/26; 55/58; 55/62; 55/68; 55/74; 55/75; 55/179; 55/387; 55/389
[58] Field of Search ................... 55/25, 26, 31, 33, 35, 55/58, 62, 68, 74, 75, 161–163, 179, 387, 389

[56] References Cited

U.S. PATENT DOCUMENTS

| | | | |
|---|---|---|---|
| Re. 31,014 | 8/1982 | Sircar | 55/26 |
| 3,430,418 | 3/1969 | Wagner | 55/25 |
| 3,923,477 | 12/1975 | Armond et al. | 55/25 |
| 4,171,207 | 10/1979 | Sircar | 55/26 |
| 4,256,469 | 3/1981 | Leitgeb | 55/25 |
| 4,264,339 | 4/1981 | Jüntgen et al. | 55/25 |
| 4,376,639 | 3/1983 | Vo | 55/26 |
| 4,376,640 | 3/1983 | Vo | 55/26 |
| 4,440,548 | 4/1984 | Hill | 55/26 |
| 4,477,265 | 10/1984 | Kumar et al. | 55/26 |

Primary Examiner—Robert Spitzer
Attorney, Agent, or Firm—Reed Smith Shaw & McClay

[57] ABSTRACT

A process for producing an enriched gas stream substantially continuously in first and second adsorption zones by (a) serially passing co-currently a gaseous mixture containing the gas to be enriched through a first adsorption zone having a primary adsorption column and an auxiliary column under pressure to produce an enriched gas stream; (b) discontinuing the flow of gaseous mixture prior to breakthrough and immediately thereafter equalizing the pressure in the first adsorption zone with the pressure in the primary column of the second zone by substantially simultaneously (i) equalizing the auxiliary column from its outlet to the outlet of the primary column substantially to the same pressure in the primary column of the second adsorption zone, and simultaneously equalizing from the inlet of the primary column of the first adsorption zone to the inlet of the primary column of the second adsorption zone; and (ii) pressurizing the auxiliary column of the second adsorption zone substantially to the same pressure in the primary column of the second adsorption zone; (c) venting the first adsorption zone counter-currently to atmospheric pressure; (d) purging the first adsorption zone; (e) concurrently with steps (c) and (d), pressurizing the second adsorption zone with feed gas mixture to the adsorption pressure and producing enriched product gas from the outlet of said second adsorption zone; (f) pressurizing the auxiliary column of the first zone with enriched product gas and equalizing the primary column of the first adsorption zone with the second adsorption zone pressure and repeating steps (a) through (e).

14 Claims, 4 Drawing Figures

AUXILIARY BED PRESSURE SWING ADSORPTION MOLECULAR SIEVE

FIELD OF THE INVENTION

The present invention relates to an improved pressure swing adsorption molecular sieve system having an auxiliary bed or column in series with the main adsorption bed or column to obtain high purity gas separation of gaseous mixtures.

BACKGROUND OF THE INVENTION

It is generally known that gaseous mixtures, i.e., air and other gas mixtures primarily comprised of at least two components of different molecular size, may be separated by pressure swing adsorption. This is achieved by passing the gas mixture through a column of adsorbent at an elevated pressure ("adsorption pressure") so that one or more of the components is selectively adsorbed. The selectivity is governed by the pore size distribution in the adsorbent and the pore volume of the proper pore size for the particular component. In this process the gas molecules with a kinetic diameter less than or equal to the pore size are retained or adsorbed on the absorbent while larger diameter molecules pass through the column.

While the adsorbent sieves the gas according to molecular size, it is also possible to fractionate the gas mixture by means of the different rates of diffusion of its components into the pore system of the adsorbent. Accordingly, both methods of obtaining enriched or high purity gas by use of pressure swing adsorption will be included within the present discussion and invention.

Typically, pressure swing adsorption systems include at least two columns of adsorbent so that one column may be regenerated while the other is adsorbing. The complementary cycling between regeneration and adsorption is effected when the gas exiting from the adsorption column exceeds the desired composition of the adsorbed components of the gas entering the column. This point is known as the "breakthrough" point. As the breakthrough point is reached, the phase is switched from adsorption to regeneration. Cyclic operation of adsorbent columns permits an almost constant stream of enriched product gas. U.S. Pat. No. 4,376,640; and U.K. No. 2,018,153 are examples of such systems.

To obtain higher than 99.9% purity of enriched gases, it has been disclosed to use more than one adsorption column during the adsorption phase. Up to ten such columns have been proposed, but the increase in purity has been more than offset by the attendant high costs associated with the additional equipment and energy used. A large number of schemes have been proposed to effect separation of various gases including methane, oxygen, nitrogen, argon and the like.

The recovery of nitrogen-enriched gas from air utilizing an adsorption process employing molecular sieve carbons is well known. See for example, Juntgen, et al., U.S. Pat. No. 4,264,339 which describes a two equal sized column adsorption process for the production of nitrogen-enriched gas. This process uses a pressure equalization between the two columns through their tops and bottoms.

Four-column pressure swing adsorption units using molecular sieve carbons have been employed in the separation of oxygen and nitrogen from air. See for example, Vo, U.S. Pat. Nos. 4,376,639 and 4,376,640. In these four-column systems, two columns are arranged in series and act as a single adsorption zone during the high pressure product gas generation or the low pressure regeneration step. The restoration of pressure of one adsorption zone is effected by introducing the gas exiting the second carbon column of a second serially connected two-column adsorption zone into its inlet while feeding the gaseous mixture solely through the inlet of the second carbon column of this second adsorption zone.

A four-column pressure swing adsorption system has been successfully employed in the separation of hydrogen gas from its mixture with carbon dioxide, carbon monoxide, water and methane. See Wagner, U.S. Pat. No. 3,430,418. The columns in this four-column system are arranged in parallel and have identical functions in each cycle of operation.

Typically, the present molecular sieve technology provides a low yield of product gas and requires large amounts of molecular sieve. Additionally, the prior art processes are energy inefficient in their regeneration methods.

It is, therefore, an object of the present invention to obtain an increased yield of enriched gas in a more cost effective and simpler manner. It is a further object of the present invention to provide a method and apparatus for obtaining increased purities of gas in a simple way without the costly equipment associated with the prior art.

SUMMARY OF THE INVENTION

The present invention provides important advantages over analogous multiple column adsorption processes by utilizing at least first and second adsorption zones each of which comprises a primary and an auxiliary adsorption column connected in series*. Each of the columns contains a molecular sieve, preferably carbon, for the selective adsorption of gas molecules. The adsorption zones are operated in complementary phases with a complementary zone so that as one is adsorbing the associated complementary zone is being regenerated. In this way, a substantially continuous supply of enriched product gas can be obtained. In this respect, the present invention is similar to those disclosed in U.S. Pat. Nos. 4,376,639 and 4,376,640. However, important differences exist between these processes.

*It is to be understood that while referred to as a primary and an auxiliary "column," both the primary and auxiliary adsorption beds can be physically housed in a single column using controllable inlet and outlet means between the beds.

In general, the process for producing an enriched gas stream in the present invention comprises the phased cycles of serially passing, co-currently, a gaseous mixture containing the gas to be enriched through at least a first adsorption zone; first through the primary adsorption column and then through the auxiliary column at a pressure of from about 1.01 to 200 bars to produce an enriched gas stream which may be stored under pressure.

Prior to breakthrough the flow of gaseous mixture is stopped and immediately thereafter the pressure in the first adsorption zone is equalized with the pressure in the primary column of a second or complementary zone by substantially simultaneously (i) equalizing the auxiliary column of said first adsorption zone from its outlet to the outlet of the primary column of said second adsorption zone; and simultaneously equalizing from the inlet of the primary column of the first adsorption zone to the inlet of the primary column of the second adsorption zone; and (ii) pressurizing the auxiliary column of the second adsorption zone to about the pressure of the primary column of said zone with said enriched gas.

Regeneration of the first zone is achieved by venting the first adsorption zone counter-currently to atmospheric pressure and thereafter counter-currently purging the first adsorption zone with a small amount of enriched product gas introduced into the outlet of its auxiliary column. Simultaneously, the second or a complementary zone is repressurized with feed gas through the inlet of the primary column to adsorption pressure and product generation is commenced. Then, the primary column of the first adsorption zone is equalized to the second adsorption zone's pressure. The auxiliary column of said first zone is pressurized with enriched product gas which had been stored or from the primary column in a system having more than two adsorption zones. The cycle is repeated for each of the two zones. As in the prior art, it is possible to obtain additional increases in yield by utilizing vacuum regeneration.

The advantages of the present invention will become more apparent from a perusal of the following detailed description of a presently preferred embodiment of the invention taken in connection with the accompanying drawings.

PRESENTLY PREFERRED EMBODIMENT OF THE INVENTION

Figure 1:
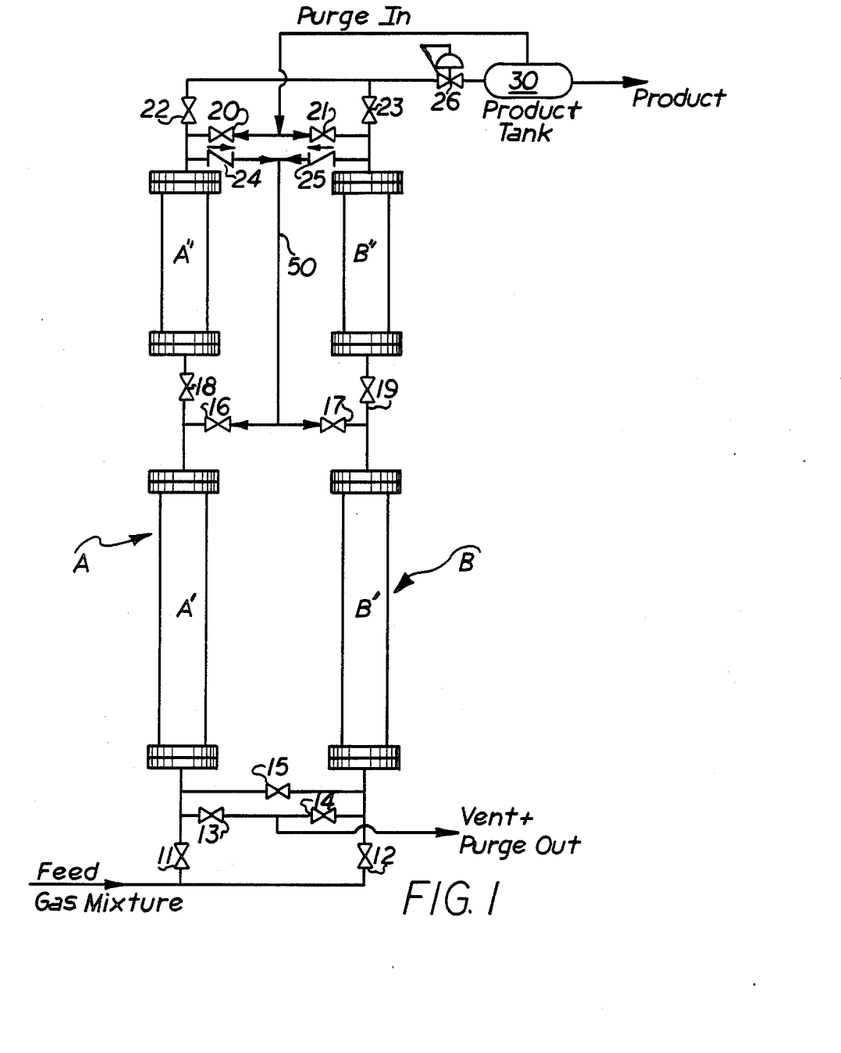
FIG. 1 is a schematic representation of a two zone apparatus of the present invention capable of carrying out the process described hereinafter.

With reference to FIG. 1, the present invention comprises a first adsorption zone A and a second adsorption zone B. First zone A is made up of a primary column A' and an auxiliary column A". While the description of the presently preferred embodiment of the invention is of a two zone system, the invention is equally applicable to a system of more than two zones such as three, four, five, etc. zones. Additional zones will increase the purity of the final product but will increase the costs associated with that product.

Each of these columns is filled with an adsorbent, preferably a carbon molecular sieve, suitable for the fractionation of the gases to be separated. Other adsorbents such as natural and synthetic zeolite molecular sieves, activated carbon, silica gel, activated alumina and diatomaceous earth can also be used as the adsorbent in the present invention. The adsorbents are useful in the separation of $O_2$ from air, $O_2$ from Argon, methane, carbon dioxide, moisture, hydrogen from hydrocarbons and $H_2S$, $CO_2$ from hydrocarbons. As described herein, the carbon molecular sieve is used to separate nitrogen from air.

Generally, carbon molecular sieves have a controlled pore structure which is developed during the manufacture of the sieve. This pore structure allows for the discrimination and, therefore, separation of the gases of different molecular sizes. One carbon sieve useful in this process is described in U.S. Pat. No. 4,124,529, incorporated herein by reference. In general, however, any adsorbent capable of separating one or more components of a gaseous mixture based upon a molecular size or diffusion rate differential may be employed in the invention to separate specific gases.

As described in connection with first adsorption zone A, a second or complementary adsorption zone B comprises a primary column B' and an auxiliary column B". Both first and second zones A and B are connected to a mixture of gas through transfer means comprising valves 11 and 12, respectively, and associated gas lines. When first adsorption zone A is being used to produce an enriched gas stream, second adsorption zone B is being regenerated for use in the subsequent adsorption phase. By alternating between the first and second zones, it is possible to provide a substantially continuous flow of enriched product gas such as nitrogen, methane, oxygen, hydrogen and the like.

The gas to be separated, such as air, is introduced under pressure, for example from 1.01 to 20 bars and in some applications up to 200 bars, into the first adsorption zone A by way of valve 11 into the inlet of primary column A'. The gas flows co-currently through column A' into auxiliary column A" through a second transfer means which includes valve 18. The enriched product gas exits from auxiliary column A" through first gas transfer means which includes valve 22 and may be stored under pressure in product tank 30. At or preferably prior to breakthrough, the flow of gas is interrupted to equalize first zone A with the pressure in primary column B' of second adsorption zone B.

Equalization is achieved by closing valves 11, 19 and 22 and permitting gas to flow from the outlet of auxiliary column A" to the outlet of primary column B' of the second adsorption zone through check valve 24 and valve 17 which comprise the third gas transfer means. The third gas transfer means also includes check valve 25, valve 16 and interconnecting gas line 50. Simultaneously therewith, gas flows from the inlet of primary column A' to the inlet of primary column B' through valve 15 which is opened for this purpose. At the same time, valve 21 is opened to permit product gas to enter auxiliary column B" to pressurize B" to a pressure close to, preferably equal to, that of primary column B'.

Valve 13 of the fourth gas transfer means (which means also includes valve 14) is then opened to permit first adsorption zone A to vent counter-currently to atmospheric pressure. A small amount of product gas is permitted to enter auxiliary and primary columns A" and A' through the outlet of auxiliary column A", to purge the adsorbed gas on the molecular sieve. Thereafter, primary column A' is equalized with B' and B" and A" is pressurized with product gas from tank 30 to prepare the first adsorption zone A for the next adsorption phase. Second adsorption zone B thereafter is cycled into a regeneration phase following the above described steps and first zone A is pressurized with the feed gas mixture.

Figure 2:
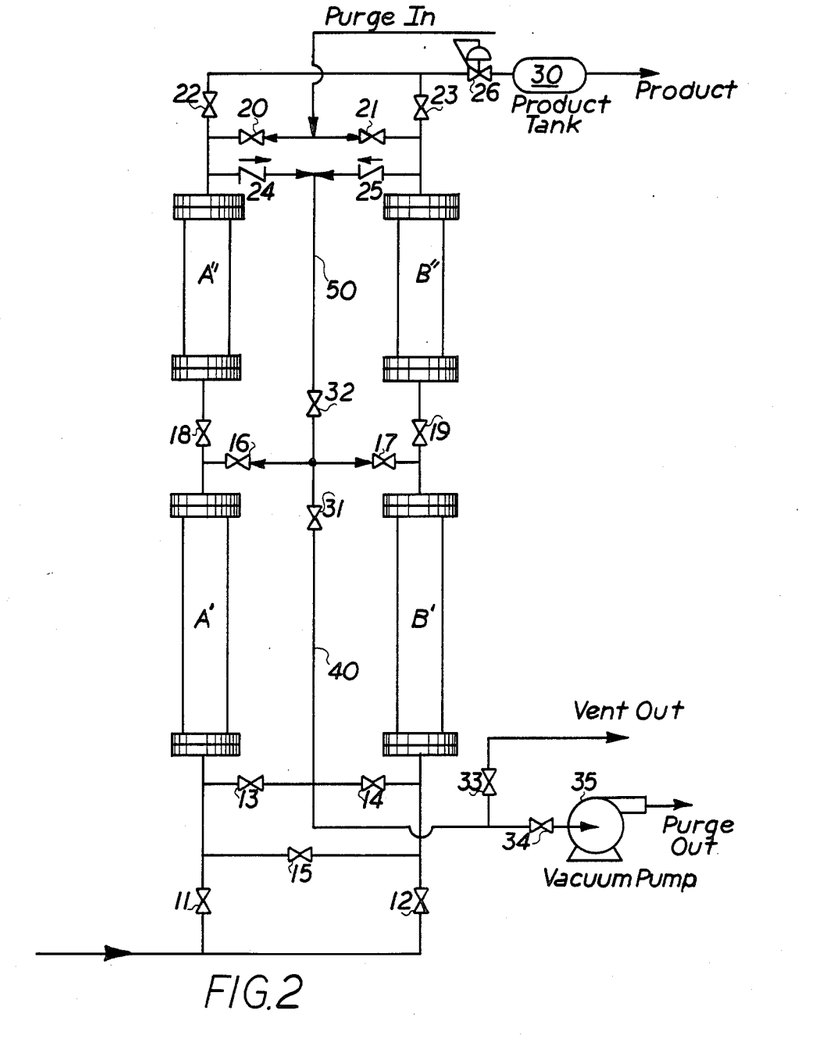
FIG. 2 is a schematic representation of the two zone apparatus shown in FIG. 1 adapted to use vacuum purge means wherein like reference numerals refer to like items.

In addition to purging with enriched product gas from tank 30, enriched gas from the primary column of another adsorption zone may be used as well as using a vacuum pump. Referring to FIG. 2, line 40 is used between the outlets and inlets of primary columns A' and B'. Line 40 includes valve 31 and terminates at vacuum pump 35. A vent is positioned ahead of vacuum pump 35 and includes valves 33 and 34 to vent to the atmosphere. An additional valve 32 is interposed in the line between the inlets and outlets of auxiliary columns A" and B". Use of a vacuum pump to purge the beds of adsorbents is extremely effective as shown in the prior art processes; see, for example, Tables III and IV below which show the effect of using vacuum regeneration in the present invention. However, attendant costs increases are associated with vacuum processes, and the successful employment of this invention does not require the use of vacuum regeneration techniques.

Where ambient air is used as the feed gas, it is typically compressed and dried prior to introduction into the system. The air may be modified prior to adsorption by passing it through a condenser to remove excess humidity. A relative humidity of about or less than 40% is preferred. Additionally, the air may be filtered or scrubbed to remove gases such as carbon dioxide, sulfur dioxide or oxides of nitrogen. As is well known in the art, these steps improve the purity of the enriched gas stream and are employed when the specific gas requirements call for increased purity. Also, diatomaceous earth may be included within the columns to separate the moisture out of the gas as it passes into the zone. Typically, this is done in the primary column with desiccant placed in the bottom of the column and the water vapor taken off at the bottom during regeneration.

A number of tests were done to compare the separation capabilities of the present invention having the auxiliary bed with the processes described in U.S. Pat. Nos. 4,440,548 (two-bed) and 4,376,639 (four-bed). Tables I and II below describe these tests using carbon molecular sieves to separate nitrogen from air, where % yield is the output product gas/input air and $O_2$ is the oxygen in the product gas. ECC refers to the effective amount of adsorbent needed to produce one standard cubic foot of product gas per hour.

TABLE I

DESCRIPTION OF TEST CONDITIONS

| | AVG. FEED FLOW RATE DURING PRODUCT GENERATION (std. 1/min.) | AVG. PURGE FLOW RATE (std. 1/min.) | VACUUM (in. Hg) | BED DEPTH OF EACH ADSORPTION ZONE (inches) | BED DEPTH OF FIRST COLUMN (in.) | SECOND COLUMN (in.) |
|---|---|---|---|---|---|---|
| y Bed | 9.943 | 0.507 | N/A | 150 | 100 | 50 |
| y Bed | 9.111 | 0.507 | N/A | 150 | 100 | 50 |
| y Bed | 10.920 | 0.508 | N/A | 150 | 100 | 50 |
| y Bed | 11.988 | 0.505 | N/A | 150 | 100 | 50 |
| y Bed | 11.906 | 0.510 | N/A | 150 | 100 | 50 |
| (4,440,548) | 7.402 | 0.470 | N/A | 150 | N/A | N/A |
| (4,440,548) | 9.215 | 0.516 | N/A | 150 | N/A | N/A |
| (4,440,548) | 9.360 | 0.516 | N/A | 150 | N/A | N/A |
| (4,440,548) | 10.542 | 0.514 | N/A | 150 | N/A | N/A |
| (4,440,548) | 10.827 | 0.520 | N/A | 150 | N/A | N/A |
| (4,440,548) | 11.949 | 0.520 | N/A | 150 | N/A | N/A |
| d (4,376,639) | 11.034 | N/A | 25.2 | 150 | 75 | 75 |
| d (4,376,639) | 11.937 | N/A | 25.0 | 150 | 75 | 75 |
| d (4,376,639) | 17.319 | N/A | 25.3 | 150 | 75 | 75 |

TABLE II

| TEST | MODE | PRESSURE (psig) | AVG. FEED FLOW RATE (std. 1/min.) | AVG. PRODUCT FLOW RATES (std. 1/min.) | YIELD (%) | $O_2$ (Vol. %) | ECC (lb/SCFH) |
|---|---|---|---|---|---|---|---|
| 603 | Auxiliary Bed | 115 | 9.868* | 1.944 | 19.7 | 0.10 | 1.86 |
| 601 | Auxiliary Bed | 115 | 9.457 | 1.924 | 20.3 | 0.13 | 1.88 |
| 593 | Auxiliary Bed | 115 | 10.491* | 2.951 | 28.1 | 0.50 | 1.22 |
| 594 | Auxiliary Bed | 115 | 11.310* | 3.692 | 32.6 | 0.97 | 0.98 |
| 584 | Auxiliary Bed | 115 | 11.180 | 3.790 | 33.9 | 1.20 | 0.95 |
| 628 | Two-Bed | 115 | 8.602 | 1.136 | 13.2 | 0.15 | 3.18 |
| 625 | Two-Bed | 115 | 9.855* | 2.163 | 21.9 | 0.47 | 1.67 |
| 626 | Two-Bed | 115 | 9.940 | 2.164 | 21.8 | 0.51 | 1.67 |
| 627 | Two-Bed | 115 | 10.851* | 2.899 | 26.7 | 0.99 | 1.25 |
| 623 | Two-Bed | 115 | 11.327* | 3.186 | 28.1 | 1.22 | 1.13 |
| 624 | Two-Bed | 115 | 12.015 | 3.811 | 31.7 | 1.75 | 0.95 |
| 634 | Four-Bed | 115 | 12.273 | 1.770 | 14.4 | 0.66 | 2.05 |
| 633 | Four-Bed | 115 | 13.065 | 2.634 | 20.2 | 1.03 | 1.38 |
| 636 | Four-Bed | 115 | 17.775 | 6.000 | 33.8 | 1.93 | 0.60 |

*matches/comparable tests

Figure 3:
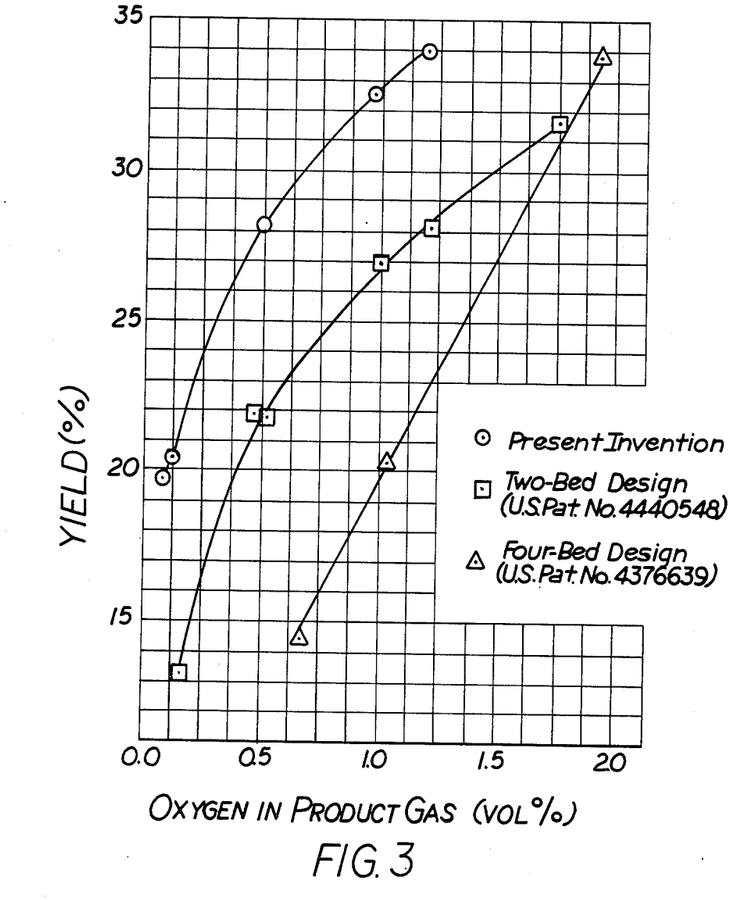
FIG. 3 is a graphical yield comparison of the present invention with the two-bed pressure swing adsorption method and apparatus of the prior art for air separation as taught in U.S. Pat. No. 4,440,548 and the four-bed pressure swing adsorption method and apparatus described in U.S. Pat. No. 4,376,639.
Figure 4:
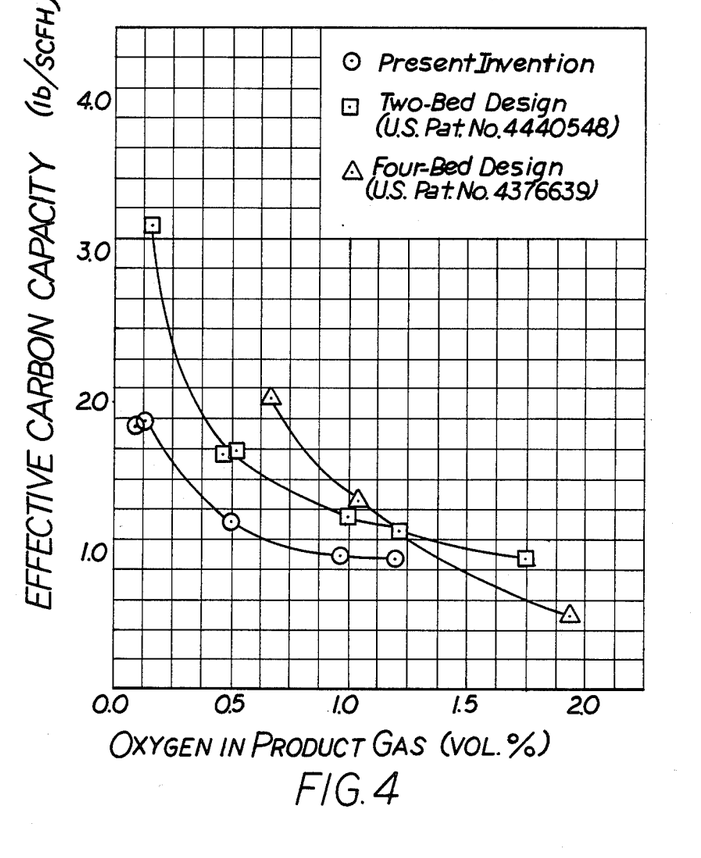
FIG. 4 is a graphical comparison of the effective carbon capacity for present invention and prior art two-bed and four-bed pressure swing adsorption systems for air separation shown in FIG. 3.

Referring to FIGS. 3 and 4 graphical representations of the test results described in Tables I and II are shown in which the present invention is compared to a standard two-bed and a standard four-bed pressure swing adsorption process for the separation of air. As can be seen from the graph, significant and unexpected yield of nitrogen is obtained over these two conventional state-of-the art processes using two and four-beds. This conclusion is also confirmed in FIG. 3 which graphically displays the effective carbon or adsorbent capacity, which is the necessary amount of carbon or adsorbent required to produce one standard cubic foot per hour of enriched product gas.

While similar yields or effective capacities have been achieved in the prior art through multiple adsorption columns and the use of vacuum pumps, no system has achieved the purity that the present invention achieves without the use of expensive additional columns or equipment. Furthermore, while the primary and auxiliary columns have been shown and described as separate columns, they can be combined in a single column with a manifold gas distribution system separating them. Additionally, it is possible to increase the yields utilizing vacuum regeneration.

Generally, the same procedure is used with single column as with two columns; however there are slight differences which need to account for the lack of a separate auxiliary column. Normally the process for producing an enriched gas stream comprises the complementary cycles of (a) passing co-currently a gaseous mixture containing the gas to be enriched through the first adsorption zone containing the primary adsorption bed and the auxiliary adsorption bed serially connected in the single column supplied with a manifold gas distribution system separating the respective outlet and inlet to the beds. This gas is passed through the beds at a pressure of from 1.01 to about 200 bars to produce an enriched gas stream;

(b) discontinuing the flow of gaseous mixture prior to breakthrough and immediately thereafter equalizing the pressure in the first adsorption zone with the pressure in the second adsorption zone by substantially simultaneously (i) directing gas from the outlet of the first adsorption zone into the manifold gas distribution system in the second adsorption zone and simultaneously directing said gas through the inlets of the first and second adsorption zones, and (ii) directing the enriched gas into the outlet of the second adsorption zone;

(c) venting the first adsorption zone counter-currently to atmospheric pressure;

(d) purging said first adsorption zone;

(e) concurrently with steps (d) and (e), pressurizing the second adsorption zone with feed gas mixture to the adsorption pressure and producing enriched product gas from the outlet of the second adsorption zone;

(f) equalizing the first adsorption zone with the second adsorption zone by directing gas from the outlet of the second adsorption zone into the manifold gas distribution system in the first adsorption zone and simultaneously into the inlet of the first adsorption zone through the inlet of the second adsorption zone; and directing said enriched gas into the outlet of the first adsorption zone;

(g) conducting steps (a) through (e) for said second adsorption zone simultaneously with those of the first adsorption zone, but in complementary phase therewith.

As can be seen, the process for the single column containing both the primary and auxiliary beds is substantially the same as separate beds. The manifold gas distribution means may be any conventional manifold used to distribute gas into the base of the auxiliary bed.

Tables III and IV below are illustrative of the advantages achievable using vacuum regeneration in the process of the present invention. As shown in these Tables, vacuum regeneration was applied at various locations in the system. These locations are specifically described within the tables.

TABLE III

| | AUXILIARY-BED PSA PROCESS WITH VACUUM REGENERATION | | | | | |
|---|---|---|---|---|---|---|
| TEST | AVG. FEED FLOW RATE DURING PRODUCT GENERATION (std. l/min.) | AVG. FEED FLOW RATE DURING CYCLE (std. l/min.) | AVG. PURGE FLOW RATE (std. l/min.) | AVG. PRODUCT FLOW RATE DURING CYCLE (std. l/min.) | VACUUM (in. Hg) | PRESSURE (psig) |
| 643[1] | 10.824 | 11.144 | N/A | 3.195 | 25.9 | 115 |
| 640[1] | 11.660 | 11.636 | N/A | 3.785 | 26.1 | 115 |
| 641[1] | 13.331 | 12.783 | N/A | 4.669 | 26.1 | 115 |
| 642[1] | 14.846 | 13.829 | N/A | 5.477 | 26.0 | 115 |
| 644[2] | 10.721 | 10.946 | 0.50 | 3.303 | 24.1 | 115 |
| 645[2] | 13.327 | 12.563 | 0.50 | 4.638 | 23.8 | 115 |
| 650[3] | 13.891 | 13.170 | 0.50 | 4.937 | 25.9 | 115 |
| 652[4] | 11.888 | 11.995 | N/A | 3.663 | 25.4 | 115 |
| 651[4] | 14.633 | 13.891 | N/A | 5.214 | 24.5 | 115 |

N/A — Not Applicable
NOTES FOR TABLES III AND IV:
[1]Entire adsorption zone evacuated, vacuum applied at bottom of primary bed.
[2]Auxiliary bed evacuated, vacuum applied at bottom of auxiliary bed, primary bed purged with product gas.
[3]Auxiliary bed purged with product gas, main bed evacuated, vacuum applied at both top and bottom of main bed.
[4]Entire adsorption zone evacuated, vacuum applied at bottom of auxiliary bed and at top and bottom of main bed.

TABLE IV

| | AUXILIARY-BED PSA PROCESS WITH VACUUM REGENERATION | | | | | |
|---|---|---|---|---|---|---|
| TEST | BED DEPTH OF EACH ADSORPTION ZONE (inches) | BED DEPTH OF FIRST COLUMN (inches) | SECOND COLUMN (inches) | YIELD (%) | $O_2$ (Vol. %) | ECC (Lb/SCFH) |
| 643[1] | 150 | 100 | 50 | 23.0 | 0.10 | 1.41 |
| 640[1] | 150 | 100 | 50 | 26.8 | 0.19 | 1.16 |
| 641[1] | 150 | 100 | 50 | 31.9 | 0.50 | 0.89 |
| 642[1] | 150 | 100 | 50 | 35.3 | 0.99 | 0.74 |
| 644[2] | 150 | 100 | 50 | 19.4 | 0.11 | 1.70 |
| 645[2] | 150 | 100 | 50 | 27.7 | 0.49 | 1.04 |
| 650[3] | 150 | 100 | 50 | 30.0 | 0.49 | 0.92 |
| 652[4] | 150 | 100 | 50 | 25.7 | 0.12 | 1.17 |
| 651[4] | 150 | 100 | 50 | 31.7 | 0.51 | 0.82 |

Therefore, while a presently preferred embodiment of the invention has been shown and described in particularity, it may be otherwise embodied within the scope of the appended claims.

What is claimed is:

1. A process for producing an enriched gas stream substantially continuously in a system consisting of at least first and second adsorption zones each of which comprises a primary column and an auxiliary column connected in series and contains an adsorbent capable of selective adsorbing at least one component of a gaseous mixture; said process comprising the complementary steps of
   (a) serially passing co-currently said gaseous mixture containing the gas to be enriched through a first adsorption zone having a primary adsorption column and an auxiliary adsorption column connected in series at an adsorption pressure of from about 1.01 to 200 bars to produce an enriched gas stream;
   (b) discontinuing the flow of gaseous mixture prior to breakthrough from said first adsorption zone and immediately thereafter equalizing the pressure in said first adsorption zone with the pressure in the primary column of said second adsorption zone by substantially simultaneously
      (i) equalizing the auxiliary column of said first adsorption zone from its outlet to the outlet of the primary column of said second adsorption zone, and simultaneously equalizing from the inlet of the primary column of the first adsorption zone to the inlet of the primary column of the second adsorption zone; and
      (ii) pressurizing the auxiliary column of the second adsorption zone substantially to the same pressure of the primary column of said second adsorption zone with said enriched gas;
   (c) venting the first adsorption zone counter-currently to atmospheric pressure;
   (d) regenerating said first adsorption zone in the direction opposite to that of the gaseous mixture in step (a);
   (e) pressurizing the second adsorption zone with said gaseous mixture to the adsorption pressure and producing enriched product gas from the outlet of said second adsorption zone while continuing said venting and regeneration in said first adsorption zone;
   (f) discontinuing the flow of gaseous mixture prior to breakthrough from the second adsorption zone and immediately thereafter equalizing the pressure in said second adsorption zone with the pressure in the primary column of said first adsorption zone by substantially simultaneously
      (i) equalizing the auxiliary column of said second adsorption zone between said outlet of said column and said outlet of the primary column of said first adsorption zone, and simultaneously equalizing from the inlet of the primary column of the second adsorption zone to the inlet of said primary column of the first adsorption zone; and
      (ii) pressurizing said auxiliary column of said first adsorption zone substantially to the same pressure of the primary column of said first adsorption zone with said enriched gas;
   (g) venting said second adsorption zone counter-currently to atmospheric pressure;
   (h) regenerating said second adsorption zone in the direction opposite to that of the gaseous mixture in step (e);
   (i) while continuing the venting and regeneration in the second adsorption zone pressurizing the first adsorption zone with said gaseous mixture to the adsorption pressure; and
   (j) repeating the sequence of steps (a) through (i).

2. A process for producing an enriched gas stream substantially continuously in a system consisting of at least first and second adsorption zones each of which comprises a primary bed and an auxiliary bed arranged in series and contains an adsorbent capable of selective adsorbing at least one component of a gaseous mixture, each of said adsorption zones having an inlet and an outlet and a manifold gas distribution system separating its primary and auxiliary beds, said process comprising the complementary steps of
   (a) passing co-currently said gaseous mixture containing the gas to be enriched through a first adsorption zone having a primary adsorption bed and an auxiliary adsorption bed serially connected in a single column with a manifold gas distribution system separating said beds, said gaseous mixture being passed at an adsorption pressure of from 1.01 to 200 bars to produce an enriched gas stream;
   (b) discontinuing the flow of said gaseous mixture prior to breakthrough from said first adsorption zone and immediately thereafter equalizing the pressure in said first adsorption zone with the pressure in the second adsorption zone by substantially simultaneously
      (i) directing residual gas within the first adsorption zone from its outlet into said manifold gas distribution system in said second adsorption zone and simultaneously directing said gas from the inlet of the first adsorption zone into the inlet of the second adsorption zone, and
      (ii) directing said enriched gas into the outlet of the second adsorption zone;
   (c) venting the first adsorption zone counter-currently to atmospheric pressure;
   (d) regenerating said first adsorption zone;
   (e) concurrently with steps (c) and (d), pressurizing the second adsorption zone with said gaseous mixture to the adsorption pressure and producing enriched product gas from the outlet of said second adsorption zone;
   (f) discontinuing the flow of said gaseous mixture prior to breakthrough from the second adsorption zone and immediately thereafter equalizing said first adsorption zone with said second adsorption zone by directing gas from the outlet of said second adsorption zone into said manifold gas distribution system in said first adsorption zone and simultaneously into the inlet of the first adsorption zone through the inlet of the second adsorption zone; and directing said enriched gas into the outlet of the first adsorption zone; and
   (g) conducting steps (a) through (f) for said second adsorption zone simultaneously with those of the first adsorption zone, but in complementary phase therewith.

3. A process as set forth in claims 1 or 2, wherein said adsorption zones are regenerated with a small amount of enriched gas.

4. A process as set forth in claims 1 or 2, wherein said adsorption zones are regenerated with a vacuum applied thereto.

5. A process as set forth in claim 4, wherein said vacuum is applied to the inlets of said primary columns of said adsorption zones during regeneration to evacuate said primary adsorption columns and auxiliary columns.

6. A process as set forth in claim 4, wherein said vacuum is applied to said auxiliary columns of said adsorption zones to evacuate said auxiliary columns.

7. A process as set forth in claim 4, wherein said vacuum is applied to said auxiliary columns and said primary columns of said adsorption zones to evacuate entire said adsorption zones.

8. A process as set forth in claims 1 or 2, wherein said adsorbent of the adsorption zones comprises a carbon molecular sieve.

9. A process as set forth in claims 1 or 2, wherein said adsorbent is selected from the group of adsorbents consisting of carbon molecular sieves, natural and synthetic zeolite molecular sieves, silica gel, alumina and diatomaceous earths.

10. A process as set forth in claims 1 or 2, wherein said gaseous mixture is introduced at a pressure of from 1.01 to 20 bars.

11. An auxiliary bed pressure swing gas adsorption means comprising:
  (a) at least first and second adsorption means consisting of
    (i) a primary adsorption column having a sorbent bed and inlet and outlet means; and
    (ii) an associated auxiliary adsorption column in series with said primary adsorption column, said auxiliary column having a sorbent bed and controllable inlet and outlet means;
  (b) means for selectively controlling feed gas to be separated installed at said primary column inlets;
  (c) gas storage means for storing separated product gas selectably connected to said auxiliary column outlets and having first and second outlet means;
  (d) first gas transfer means selectably connected to said outlets of said auxiliary column and one of said storage means outlets;
  (e) second gas transfer means selectably connected to said outlets of said auxiliary columns and adapted for connection with said outlet of a primary column, said second gas transfer means including equalization means for equalizing said auxiliary column of said first adsorption means from its outlet to said outlet of said primary column of said second adsorption means simultaneously with equalizing the inlets of the primary columns of said first and second means;
  (f) means for pressurizing the auxiliary column of said second adsorption means substantially simultaneously to the same pressure as the primary column of said second adsorption zone with said gas from storage means;
  (g) means for equalizing the auxiliary column of said second adsorption means and the outlet of said primary column of said first adsorption means simultaneously with equalizing the inlet of said primary column of said second adsorption means to the inlet of said primary column of said first adsorption means;
  (h) means for pressurizing said auxiliary column of said first adsorption means substantially simultaneously to the pressure of said primary column of said first adsorption means; and
  (i) means for selectively venting said first and second adsorption means.

12. Means set forth in claim 11, wherein said gas transfer means include valves.

13. Means set forth in claim 11, wherein said gas transfer means includes vacuum means.

14. Means set forth in claim 11, wherein said sorbent is selected from the group consisting of carbon molecular sieves, natural and synthetic zeolite molecular sieves, silica gel, alumina and diatomaceous earths.

* * * * *